(12) United States Patent
Kahe et al.

(10) Patent No.: US 12,017,867 B2
(45) Date of Patent: Jun. 25, 2024

(54) CONTAINER TRANSPORT DEVICE AND CONTAINER HANDLING SYSTEM

(71) Applicant: KHS GMBH, Dortmund (DE)

(72) Inventors: Thorsten Kahe, Dortmund (DE); Ulrich Scholz, Luedinghausen (DE); Thomas Stienen, Unna (DE)

(73) Assignee: KHS GmbH, Dortmund (DE)

( * ) Notice: Subject to any disclaimer, the term of this patent is extended or adjusted under 35 U.S.C. 154(b) by 184 days.

(21) Appl. No.: 17/775,362

(22) PCT Filed: Nov. 5, 2020

(86) PCT No.: PCT/EP2020/081039
§ 371 (c)(1),
(2) Date: May 9, 2022

(87) PCT Pub. No.: WO2021/089664
PCT Pub. Date: May 14, 2021

(65) Prior Publication Data
US 2022/0380141 A1    Dec. 1, 2022

(30) Foreign Application Priority Data
Nov. 8, 2019   (DE) ..................... 10 2019 130 149.1

(51) Int. Cl.
*B65G 47/51*    (2006.01)
*B65G 15/12*    (2006.01)
(Continued)

(52) U.S. Cl.
CPC ......... *B65G 47/5104* (2013.01); *B65G 15/12* (2013.01); *B65G 21/12* (2013.01);
(Continued)

(58) Field of Classification Search
CPC .................. B65G 47/5104; B65G 41/003; B65G 41/008; B65G 21/12; B65G 41/00;
(Continued)

(56) References Cited

U.S. PATENT DOCUMENTS

| 1,719,897 A | 7/1929 | Mayo |
| 4,492,504 A * | 1/1985 | Hainsworth ............. B66F 9/07 |
| | | 414/280 |

(Continued)

FOREIGN PATENT DOCUMENTS

| DE | 4224836 C1 | 11/1993 |
| DE | 3505253 C2 | 4/1995 |

(Continued)

*Primary Examiner* — James R Bidwell
(74) *Attorney, Agent, or Firm* — Laurence A. Greenberg; Werner H. Stemer; Ralph E. Locher

(57) ABSTRACT

A container transport device for transporting containers in a container handling system includes a chassis for supporting the container transport device on a track. The chassis is equipped with a frame on which at least one tray for transporting the containers is provided in a vertically adjustable manner. The at least one tray has a transport surface with multiple transport elements arranged in a substantially parallel manner for temporarily storing and conveying containers in rows, and each transport element is drivable in a controlled and/or closed-loop manner independently of one another in two different conveying directions.

19 Claims, 6 Drawing Sheets

(51) Int. Cl.
 *B65G 21/12* (2006.01)
 *B65G 41/00* (2006.01)
 *B65G 65/00* (2006.01)

(52) U.S. Cl.
 CPC ......... *B65G 41/003* (2013.01); *B65G 41/008* (2013.01); *B65G 47/51* (2013.01); *B65G 65/00* (2013.01); *B65G 2201/0244* (2013.01)

(58) Field of Classification Search
 CPC ........ B65G 47/51; B65G 65/00; B65G 15/12; B65G 1/04
 USPC .......................................... 198/347.1–347.4
 See application file for complete search history.

(56) References Cited

U.S. PATENT DOCUMENTS

| | | | |
|---|---|---|---|
| 4,792,995 A | 12/1988 | Harding | |
| 5,202,832 A * | 4/1993 | Lisy | G05D 1/0236 414/351 |
| 6,110,088 A | 8/2000 | Mann | |
| 9,403,666 B2 | 8/2016 | Olszak et al. | |
| 10,048,697 B1 * | 8/2018 | Theobald | G05D 1/0088 |
| 10,618,732 B2 * | 4/2020 | Iwata | B65G 1/137 |
| 2014/0072392 A1 * | 3/2014 | Tanahashi | B66F 9/07 414/277 |
| 2016/0052727 A1 | 2/2016 | Petrovic | |
| 2019/0276241 A1 | 9/2019 | Royce et al. | |

FOREIGN PATENT DOCUMENTS

| | | | |
|---|---|---|---|
| DE | 4343477 C1 | 8/1995 | |
| EP | 2581328 A1 | 4/2013 | |
| WO | 2019154440 A1 | 8/2019 | |
| WO | 2019173433 A1 | 9/2019 | |
| WO | 2019179768 A1 | 9/2019 | |
| WO | 2020/102900 * | 5/2020 | ............... B65G 1/04 |

* cited by examiner

CONTAINER TRANSPORT DEVICE AND CONTAINER HANDLING SYSTEM

FIELD AND BACKGROUND OF THE INVENTION

The invention relates to a container transport device for transporting containers in a container handling system. The present invention further relates to a container handling system with at least one container transport device for transporting containers between at least two container handling machines of the container handling system.

Container handling machines with which the containers are handled individually are known to the person skilled in the art in the most widely differing configurations. In this context, the container handling machines can be, for example, labelling machines, filling machines, closing machines, packers, or shrink tunnels, such as are usually used in the beverage industry. Such container handling machines preferably exhibit a capacity of more than 10000 containers per hour, and for particular preference a capacity of 50000 containers per hour.

The term "container" in the meaning of the invention is understood to mean any type of container, in particular bottles, cans, beakers etc., made of metal, glass, and/or plastic, preferable of PET (polyethyleneterephthalate).

Within the framework of the invention, the term "container" is also to be understood to mean bundles formed from several containers, but which in each case are transported as one unit. Examples of such bundles are six-packs, or bottles or cans arranged on trays.

In the beverage industry, containers are transported to their container handling by means of a container transport system, through a container handling system, which can comprise several such container handling machines. The containers are guided for introduction into a container handling machine or into a container handling station, such as a filling machine, standing upright in a row to the respective filling station of the filling machine.

For the exact introduction of the containers in the correct division arrangement into the container handling machine, transport worm conveyors are known, into which the containers run individually one following another, and in which the containers are brought into the correct division arrangement in relation to one another and into the correct position in relation to the container handling machine.

Different container handling machines are constituent parts of a total container handling system. Such total systems cover all the handling steps, for example, which are required in order to obtain, starting from empty and dirty containers, such as glass bottles, clean, filled, closed and labelled containers, such as reusable glass bottles, which then again represent a saleable product.

In this situation it is usual for the individual container handling machines of the container handling system to follow one another in the correct sequence, such that the containers run through the container handling system in the form of a predetermined flow arrangement and at a predetermined flow speed.

In the beverage industry in particular, the problem arises that the containers which are discharged from a container handling machine in a single-track flow are to be rearranged, for transport to handling in the downstream container handling machine and/or also for their occasional buffering, into a multi-track (container) flow. For this purpose a large number of special devices have been developed in the sector of container transport, such as diverging devices, merging devices, individual separation devices, etc.

A container transport system (DE 35 05 253 C2) is known, for example, which serves to rearrange a first narrower container flow into a second wider container flow, and consists of a first transport segment configured as an inlet conveyor, of a transfer or rearrangement segment, and of a second transport segment serving as an outlet conveyor. The rearrangement segment is in this situation formed from a plurality of plate bands arranged next to one another, of which the individual speeds are overall slower in relation to the first transport segment, and in this way form the second container flow from the first container flow.

Also known is a transport device for separating out a first single-track container flow, i.e. to rearrange the single-track container flow into a second wider container flow (U.S. Pat. No. 1,719,897 A, or DE 43 43 477 C1), wherein individual containers are guided into a channel forming a rearrangement segment, which can be continuously pivoted to and fro, and in this way incurs a dividing effect on the containers running out at the end of the channel. A certain disadvantage of this known transport device lies in the fact that the channel serving as the rearrangement segment requires a relatively substantial structural length for the transport device.

The principle is also known, for example for the rearrangement of a single-track container flow into a wider container flow, of providing flaps which can be controlled and which deflect the containers. Disadvantageous in this situation is the fact that the control and movement of these flaps, and therefore the sideways displacement of the respective container must take place in such a way that the respective flap is already being moved out of the movement path of a following container, which is following directly after a container being deflected by the flap, before this following container has reached the corresponding flap. This requires rapid control and movement sequences for the flaps, and, as a rule, also leads to high lateral acceleration forces on the containers when being deflected, with serious impairment of stability of the containers on the corresponding transport segment.

It is then frequently necessary for the containers which have been rearranged or divided for transport and buffering into a multi-tracked container flow to be brought together again by means of the container transport system into a single-track container flow for the subsequent container handling on the container handling machine downstream in the transport direction.

Such transport systems with such container transport systems are therefore elaborate and expensive. Moreover, such container transport systems are configured as rigid and inflexible, such that adaptations to changed production processes, for example the use of a different container handling machine or a further container handling machine, are not possible, or only with increased effort and expenditure. It is here that the present invention comes into effect, with the aim of providing overall assistance and improvement.

SUMMARY OF THE INVENTION

Taking this as a basis, the object of the invention is to provide a container transport device for the transporting of containers in a container handling system, which can be adjusted with the maximum possible flexibility to changing production processes.

This object is solved by a container transport device for transporting containers in a container handling system in accordance with the features as claimed. The dependent claims relate to particularly advantageous further embodiments of the invention.

According to one major aspect, the invention relates to a container transport device for transporting containers in a container handling system. In this situation, the container handling device comprises at least one chassis for supporting the container transport device on a track. Arranged on the chassis is a frame, on which at least one tray is provided in a height adjustable manner for transporting the containers.

The at least one tray comprises a transport surface with multiple transport elements arranged essentially parallel to one another for temporarily storing and conveying containers in rows. Moreover, in this situation preferably each of the transport elements is configured so as to be driven in a controlled and/or regulated manner independently of the others in two different conveying directions.

According to an advantageous embodiment variant, provision is made in this situation for the chassis to comprise at least two motor-driven wheels for the autonomous movement of the container transport device along a predeterminable movement path.

According to a further advantageous embodiment variant, provision in made in this situation for a navigation device for determining a position of the container transport device.

According to a further advantageous embodiment variant, provision in made in this situation that the navigation device comprises at least one magnetic sensor for determining the relative position of the container transport device, in relation to magnets let into a base plane.

According to a further advantageous embodiment variant, provision in made in this situation that the chassis comprises a sensor to provide protection against collision.

According to a further advantageous embodiment variant, provision in made in this situation for an input device for direct inputting and/or wireless reception of movement paths.

According to a further advantageous embodiment variant, provision in made in this situation that several trays are provided at the chassis, which are preferably configured such as to be height adjustable individually and independently of the other trays.

According to a further advantageous embodiment variant, provision in made in this situation that the respective tray is configured such as to be preferably steplessly movable to the relative height of a transport plane of the container handling machine.

According to a further advantageous embodiment variant, provision in made in this situation that each tray comprises an independent motor drive, preferably a servomotor or stepping motor, for the height adjustment of the respective tray. Particularly advantageously, the motor drive provided for the height adjustment of the respective tray also serves to drive the multiple transport elements of the corresponding tray, for which purpose, for example, a mechanical gear unit can be provided, which can either establish a further connection of the motor drive to the height adjustment or to at least one transport element of the corresponding tray.

According to a further advantageous embodiment variant, provision in made in this situation that the multiple transport elements of a corresponding tray are configured such as to be driven independently of one another at different conveying speeds, in a controlled and/or regulated manner.

According to a further advantageous embodiment variant, provision in made in this situation that the multiple trays are configured as identical to one another.

According to a further advantageous embodiment variant, provision in made in this situation that the transport elements are configured such as to be slightly wider along their longitudinal extension than the greatest width or the greatest diameter of the containers being conveyed by means of the transport elements.

According to a further advantageous embodiment variant, provision in made in this situation that the transport elements are configured along their longitudinal extension as more than double as wide than the greatest width or the greatest diameter of two containers standing in contact with one another.

The expression "essentially" or "approximately" signifies in the meaning of the invention deviations from the exact value in each case by +/−10%, preferably by +/−5%, and/or deviations in the form of changes which are not of significance for the function.

Further embodiments, advantages, and possible applications of the invention are also derived from the following description of exemplary embodiments and from the Figures. In this situation, all the features described and/or represented as images are in principle the object of the invention, individually or in any desired combination, regardless of their association in the claims or reference to them. The contents of the claims are also deemed to be a constituent part of the description.

The invention is described in greater detail hereinafter on the basis of the Figures in relation to exemplary embodiments. The Figures show:

DETAILED DESCRIPTION OF THE INVENTION

Identical reference numbers are used in the Figures for elements of the invention which are the same or have the same effect. Moreover, for the sake of easier overview, only those reference numbers are used in the individual Figures which are required for the description of the respective Figure. The invention is also represented in the Figures only in a schematic view in order to explain the mode of operation. In particular, the representations of the Figures serve only to explain the underlying principle of the invention. For reasons of easier overview, the representation of all the constituent parts of the container handling system has been refrained from.

Figure 1:
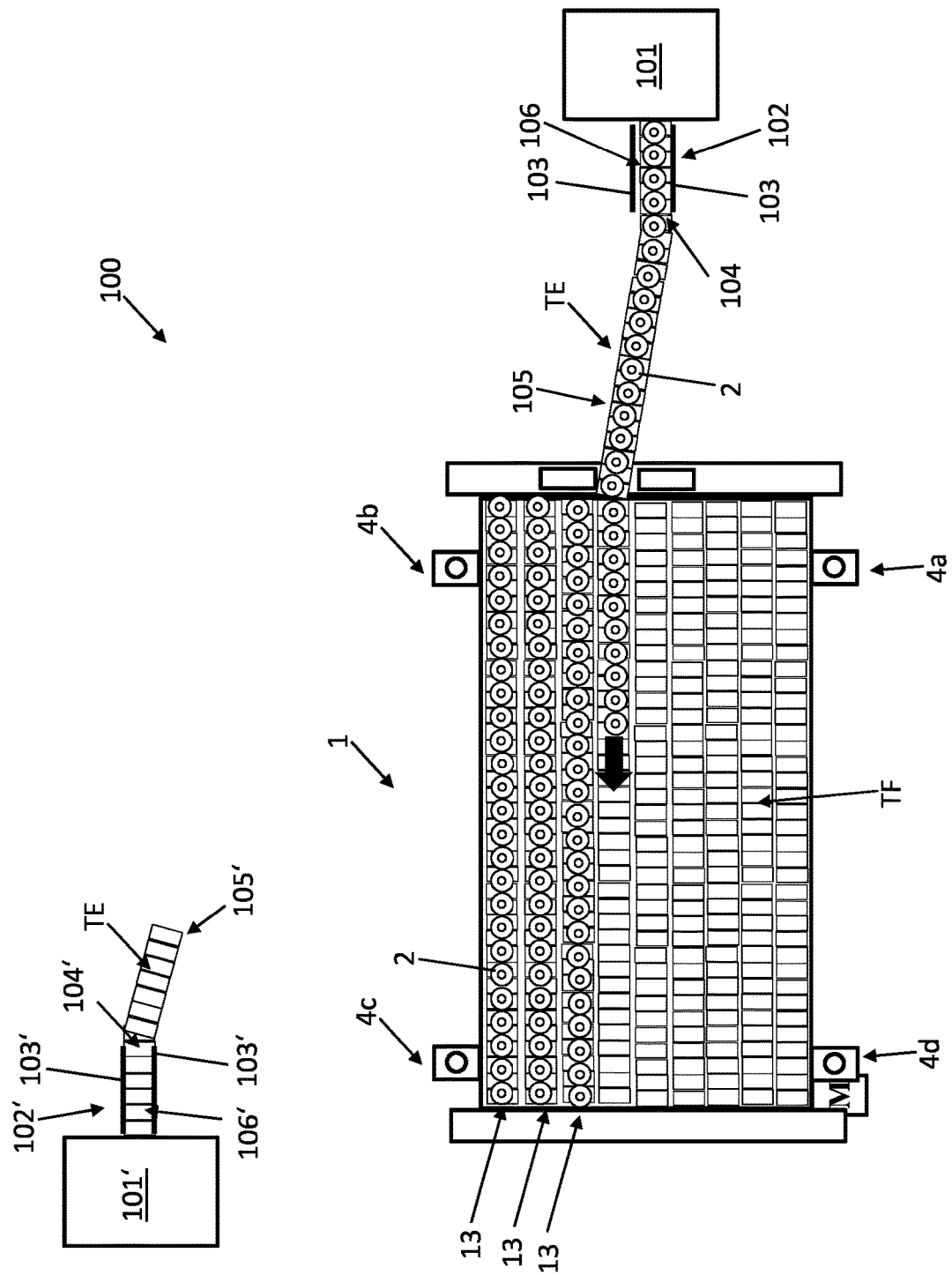
FIG. 1 By way of example, a rough schematic view from above of an embodiment variant of a container handling system according to the invention, FIGS. 2 to 5 by way of example and in a rough schematic side view, different loading states of an embodiment variant of a container transport device according to the invention, and FIG. 6 an exemplary navigation system for a container transport device according to the invention.
Figure 2:
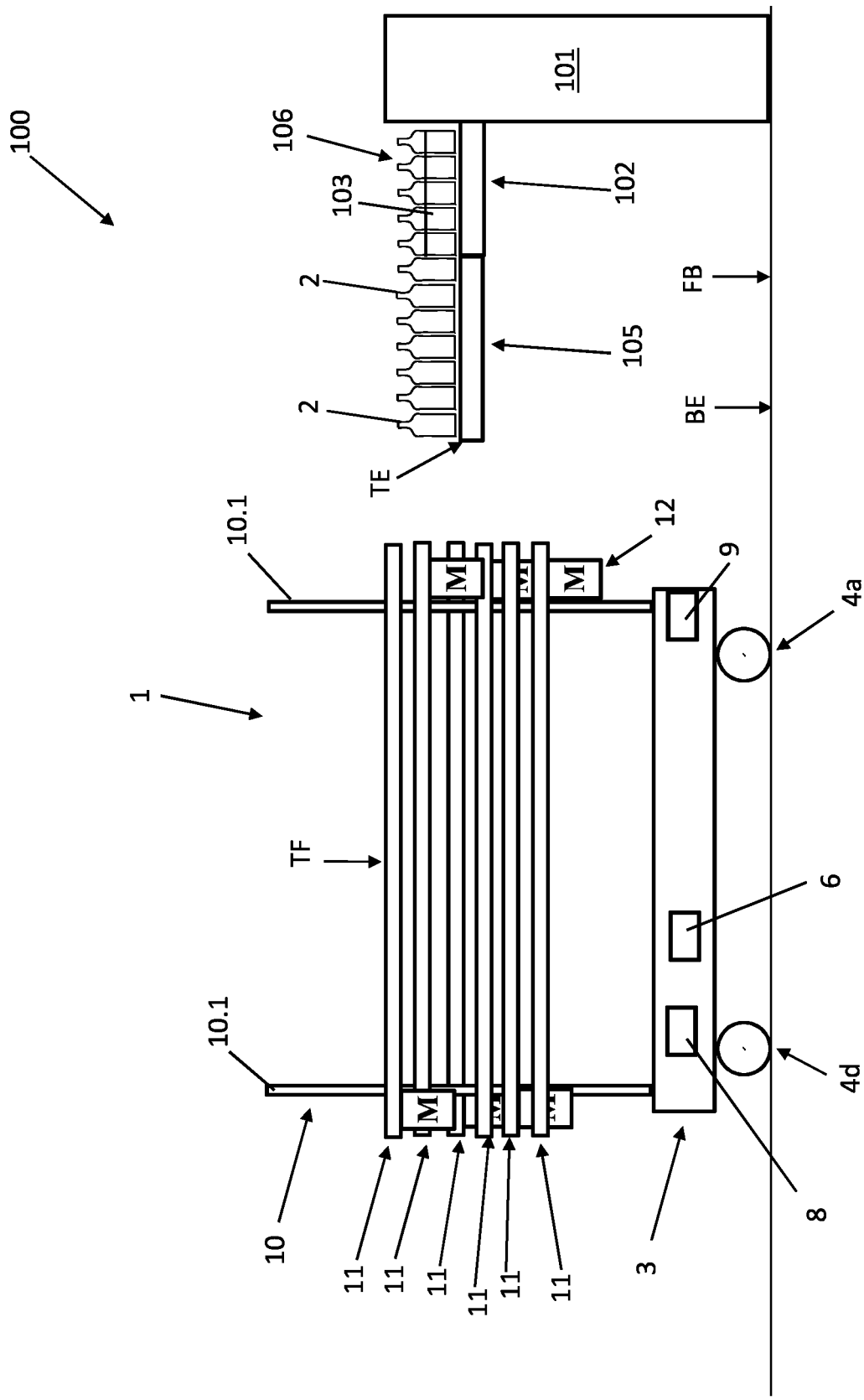
Figure 3:
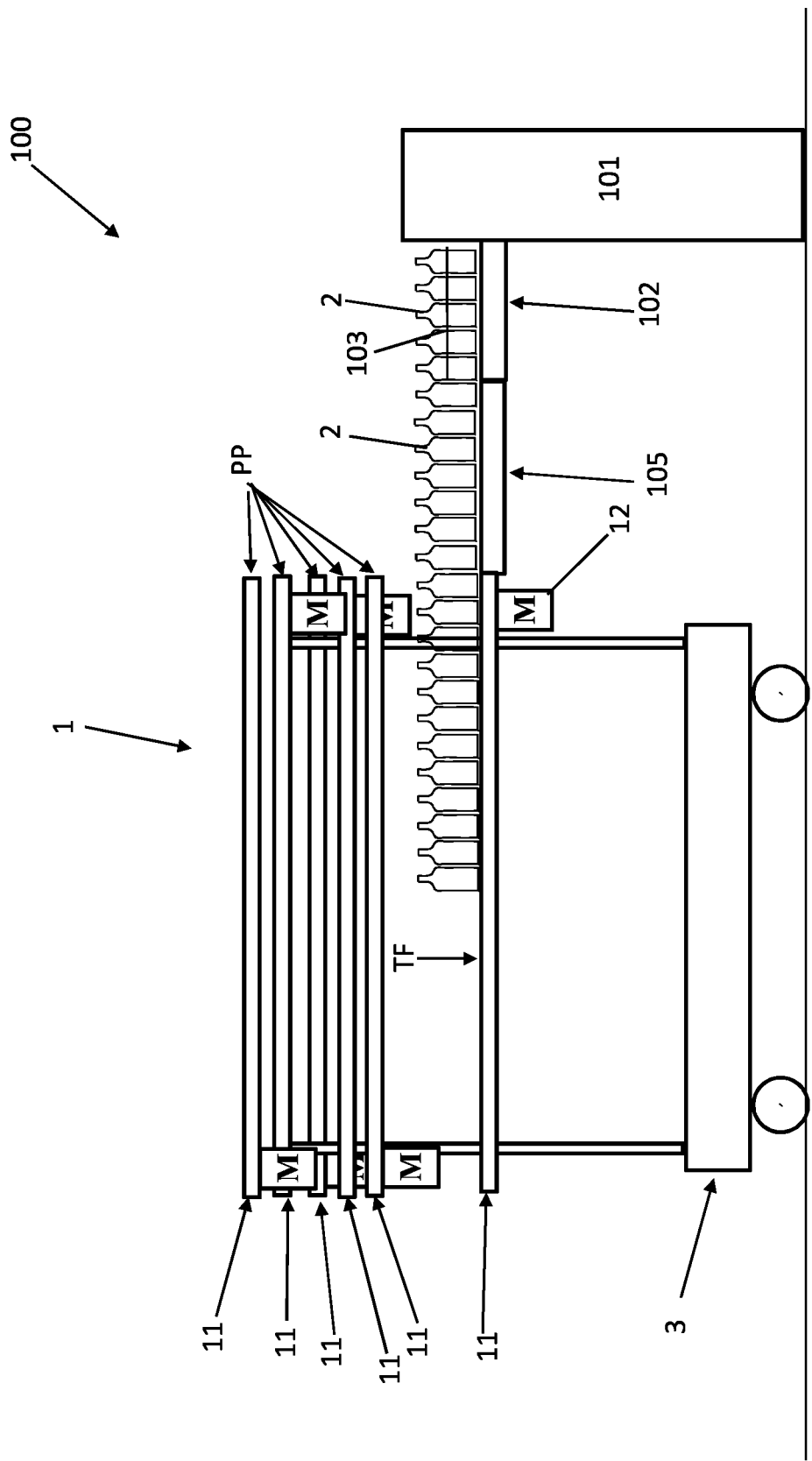
Figure 4:
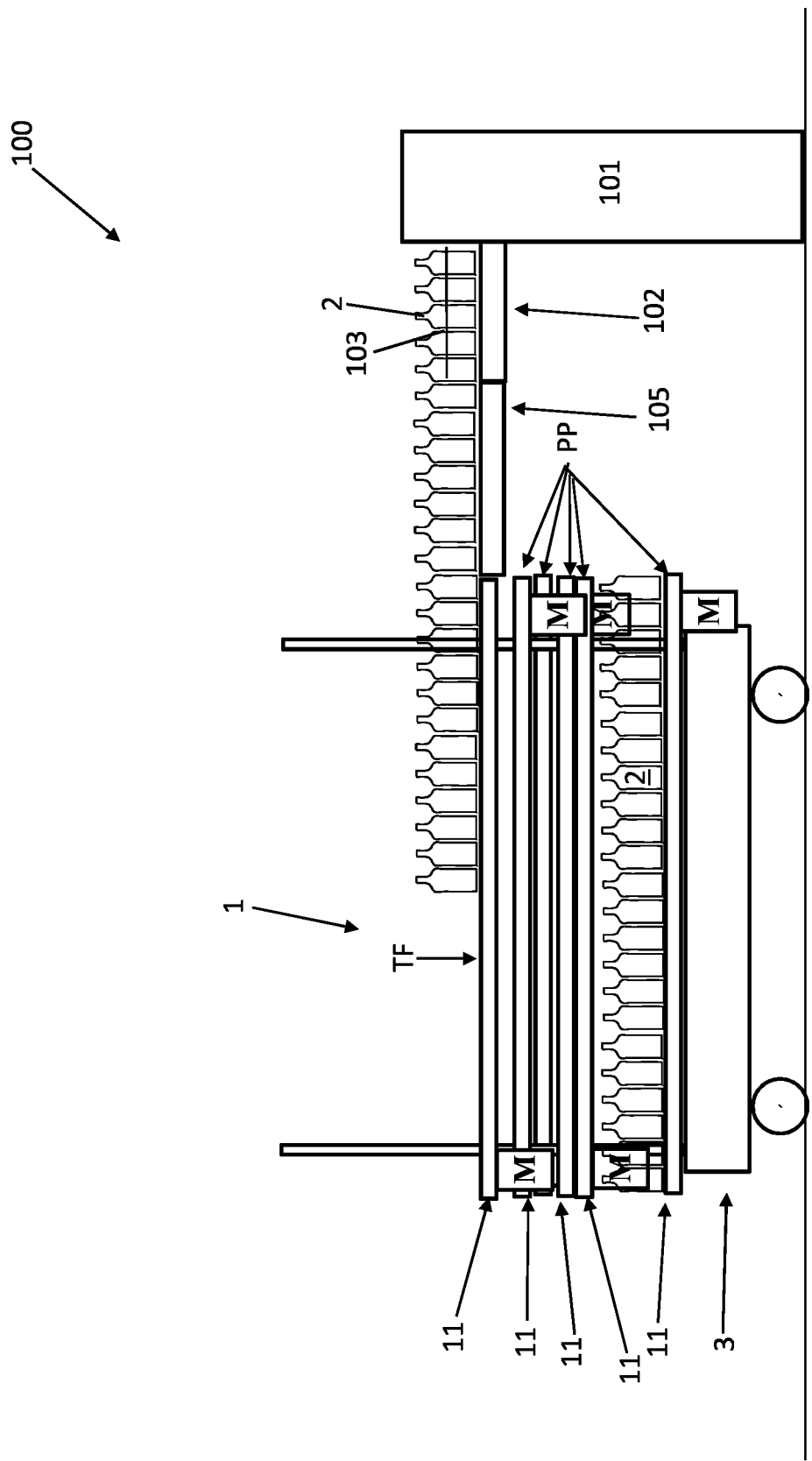
Figure 5:
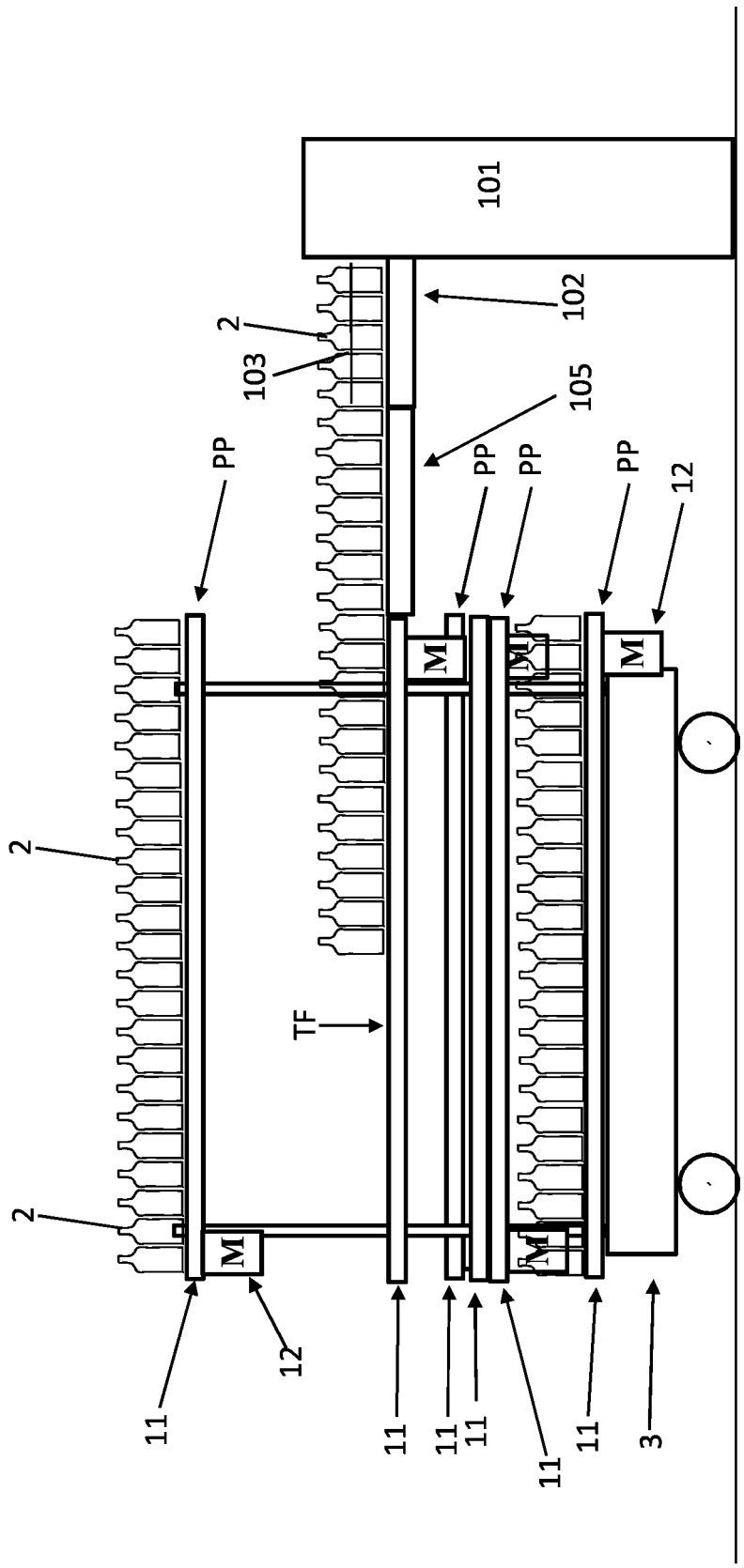

The container handling system designated in general in FIG. 1 by 100 comprises in this situation two container handling machines 101, 101', spatially separated from one another and arranged standing upright on a base plane BE, which are each configured for the handling of containers 2.

In particular, the container handling machines 101, 101' are configured such as to handle the containers 2 individually at the container handling stations provided, In this situation, the container handling machines 101, 101' can relate to a labelling machine and/or filling machine and/or a closing machine and/or a packer and/or a shrink tunnel, such as are used in the beverage industry in particular.

In the embodiment variant represented in FIG. 1, the container handling system 100 comprises, for example, two container handling machines 101, 101'. Likewise, however, embodiment variants of the invention are possible with three, four, five, six or more container handling machines 101, 101' of the container handling system 100. The container handling machines 101, 101' can also be the same or different container handling machines 101, 101'. Accordingly, for example, if two container handling machines 101, 101' are provided for, then one can be a filling machine and one a labelling machine, or, as an alternative, also two labelling machines.

In particular, the container handling machines 101, 101' exhibit a capacity of more than 10000 containers per hour, and for particular preference a capacity of 50000 containers per hour.

According to the invention, in this situation the containers 2 are transported or conveyed inside the container handling system 100 with a container transport device 1 for transporting containers 2 between the container handling machines 101, 101'.

In greater detail, in this situation the container transport device 1 is configured such as to transport the containers 2 at least between a container outlet 102 of a first container handling machine 101 and a container inlet 102' of a second container handling machine 101'.

In this situation, the container handling machines 101, 101' can comprise, at least in the region of their respective container inlets and/or container outlets 102, 102', side guide rails 103, 103' for forming guide channels 104, 104' for the single-row guiding of the containers 2. Although in FIG. 1 for the first container handling machine 101 only its container outlet 102 is represented, and for the second container handling machine 101' only its container inlet 102', nevertheless both container handling machines 101, 101' comprise in each case both a container inlet as well as a container outlet 102, 102'.

In this situation, the container handling machines 101, 101' comprise at their container inlets and/or at their container outlets 102, 102' at least one, and preferably two, docking units 105, 105' for docking the container transport device 1 in the manner described in greater detail hereinafter. Moreover, the docking units 105, 105' are configured for conveying the containers 2, in particular transporting the containers 2 standing upright, on a transport plane TE.

For particular preference, the container handling machines 101, 101' comprise at their container inlets and/or their container outlets 102, 102' a buffer surface 106, 106' for the at least temporary buffering of the containers 2.

The container transport device 1 is configured in this situation for the transporting of containers 2 within the container handling system 100, and for this purpose comprises at least one chassis 3 for supporting the container transport device 1 on a track FB, which coincides with the base plane BE.

In the exemplary embodiment represented, the chassis 3 comprises four wheels 4a, 4b, 4c and 4d. The wheels 4a, 4b are configured in this case as drive wheels, while the wheels 4c and 4d can be configured as non-driven idler rollers. The wheels 4a, 4b configured as drive wheels, by having different speeds of rotation, can allow for differential speed steering of the container transport device 1.

As an alternative, the wheels 4a, 4b configured as drive wheels can be steered about a vertical axis by means of a steering drive, not represented in any greater detail, in order to achieve the steering of the container transport device 1. In particular, the wheels configured as drive wheels 4a, 4b, are arranged for this purpose so as to be rotatable in each case through 360° about the vertical axis at the chassis 3.

In this situation, a battery serves as the power supply for the container transport device 1. As an alternative, the energy supply can also be provided by means of a double-layer capacitor. This solution is characterised by very short charging cycles, for example 3 seconds. In addition, with this solution a buffer battery is used, since the container transport device 1 must still be able to reach the next charging station of the container handling system 100 even with an empty capacitor, and the control system must remain active. In this situation, a control device 6 actuates the wheels 4a, 4b configured as drive rollers, such that the container transport device 1 now transports the containers 2 inside the container handling system 100, i.e. can convey them.

Figure 6:
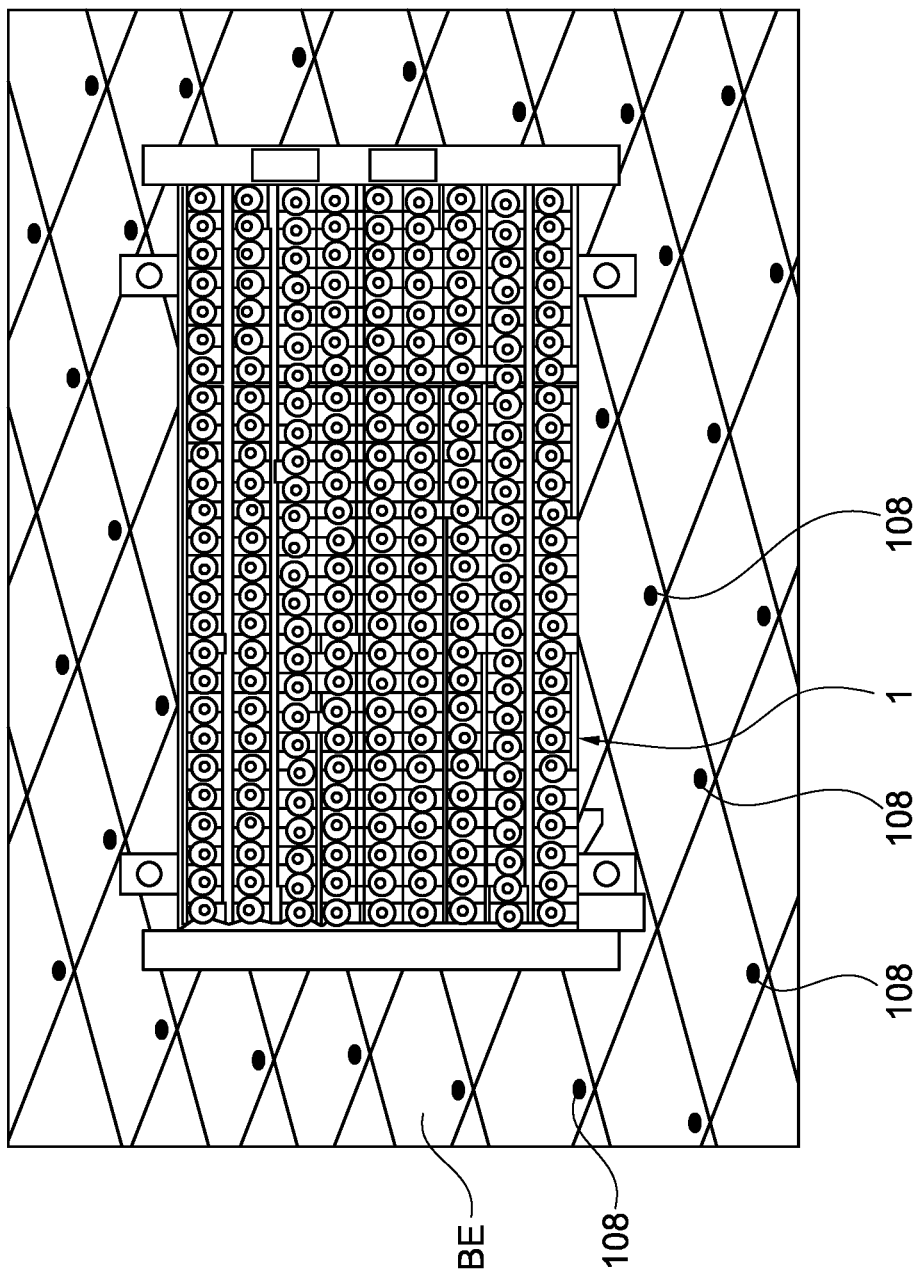

In order to allow for autonomous navigation of the container handling device 1 inside the space formed by the container handling system 1, in one exemplary embodiment, as represented in FIG. 6, a magnetic grid formed of permanent magnets 108 is laid in the floor plane BE of the working range of the container handling system 100, i.e. in the working floor, for the container transport device 1, which for the sake of easier overview are not all represented in FIG. 6. The permanent magnets 108 are in this case a part or component of the floor plane BE of the container handling system 100.

By means of a magnet sensor 8, the container transport device 1 can detect the permanent magnets 108 in the floor plane BE. When the container transport device 1 is taken into operation, a position referencing takes place. In this situation, individual x-, y-co-ordinates are allocated to each permanent magnet 108 in the floor plane BE of the container handling system 100. At the initial referencing, the container transport device 1 is notified at which co-ordinate position it is located.

From the number and location of the permanent magnets 108 of the floor plane BE detected by the container transport device 1 by means of the magnet sensor 8, a planned route can be followed. In addition to this, provision can be made that, in order to compensate for influences such as slippage at the wheels 4a, 4b, 4c, 4d, a permanent reference/actual comparison is carried out, and the movement path is corrected accordingly. As a result, an exact position determination of the container transport device 1 within the space of the container handling system 100 is possible, in this case the floor plane BE.

In addition, in order to ensure protection against collision for the container transport device 1, a sensor 9 can be provided, which is located, for example, at the front of the container transport device 1, which, in particular by means of radar, laser, ultrasonics, infrared, or the like, can identify objects in the planned movement path, i.e. the travel path of the container transport device 1, such that this can interrupt travel in the event of danger, or can initiate a diversionary manoeuvre.

The planned routes or movement tracks can be transferred to the control device 6 of the container transport device 1 by wireless means. This allows for the incorporation of the container transport device 1 into a process control system, which can transfer in each case individually for the particular container transport device 1 the respective working tasks and the travel paths associated with them. Accordingly, a high degree of individualisation of the particular container handling device 1 can be achieved.

If appropriate, the container transport device 1 can also comprise a manual input device, which allows an operator to configure a particular container handling device 1 for special tasks rapidly and without any problems independently of the process control system.

In this situation, arranged at the chassis 3 of the container transport device 1 is a frame 10, configured as a holding frame, which in its longitudinal extension extends perpendicular or approximately perpendicular to the floor plane BE. In particular, the frame 10 can be formed from four tubular holding means 10.1, which can be configured as hollow profiles. In particular, the holding means 10.1, as tubular profile bars, are configured with concentric, rectangular, oval, or other enclosed cross-sections, the walls of which consist of steel, in particular special steel, or another material such as aluminium.

In this situation, provided on the frame 10 is at least one tray 11 for transporting the containers 2 in a height-adjustable manner, i.e. movable upwards and/or downwards. In particular, several trays 11, preferably more than 5 trays, are arranged on the frame 10 of the container transport device 1, each of them being height-adjustable.

Advantageously, the multiplicity of trays 11 are configured to be height-adjustable independently of one another, such that each tray 11 can exhibit an individual height relative to the floor plane BE as well as to the adjacent tray 11, i.e. located above or beneath it.

Advantageously, the multiplicity of trays 11 form in each case a transport surface TF for the containers 2 on their corresponding upper side. The respective transport surfaces TF of adjacent trays 11 are configured in each case as being height-adjustable parallel to one another and parallel to the floor plane BE. It is also conceivable to have an acute-angled alignment of a tray 11 in relation to the base plane BE. This must then be adjusted in such a way, however, that the containers 2 which are introduced onto the transport surface TF of the tray 11 must be inclined such that they do not fall over, i.e. a stable standing arrangement for the containers 2 is still ensured.

For this purpose, each tray 11 can comprise an independent motor drive 12, in particular an electric motor, and particularly advantageously a servo motor or a stepping motor drive. It is also possible for the multiplicity of trays 11 to comprise a common motor drive 12 for adjusting the height. The respective motor drive 11 is in this case fed with energy via the battery 5, and controlled and/or regulated by means of the control device 6.

In particular, the container transport device 1 is configured such as to move the respective tray 11, with its transport surface TF, to the relative height of the transport plane TE of a docking unit 105, 105', such that a jerk-free, i.e. stepless and planar, transfer surface is formed between the transport plane TE of the corresponding docking unit 105, 105'.

Further, the at least one tray 11 on the transport surface TF comprises several transport elements 13 arranged essentially parallel to one another in order to provide an intermediate storage and conveying arrangement of the containers 2 in the form of rows. Each of the transport elements 13 of this at least one tray 11 is in this case configured such as to be driven in a controlled and/or regulated manner independently of one another in two different conveying directions.

Provision can also be made for the transport elements 13 to be configured so as to be driven in a controlled and/or regulated manner independently of one another at different conveying speeds. Particularly advantageously, the conveying speeds of the individual transport elements 13 are configured as independently and steplessly adjustable in relation to one another.

The actuation of the transport elements 13 can be effected in this situation by means of the control device 6.

For this purpose, each transport element 13 of a corresponding tray 11 can comprise an independent motor drive, in particular an electric motor, and particularly advantageously a servomotor or stepping motor drive.

It is also possible for the multiplicity of transport elements 13 of a corresponding tray 11 to comprise a common motor drive 12, in particular an electric motor, and particularly advantageously a servomotor or stepping motor drive.

Particularly advantageously, provision is made in this situation for this common motor drive 12 of this at least one tray 11 also to be configured for the height adjustment of this tray 11. In other words, provision is made that for each tray 11 a common motor drive 12 is used both for the height adjustment of this tray 11 as well as for the drive of all the transport elements 13 of this tray 11. The common motor drive 11 is in this case fed with energy by way of the battery 5, and controlled and/or regulated by means of the control device 6.

The transport elements 13 of the at least one tray 11 are in this situation configured as endlessly circulating transport elements, in particular as transport belts and/or transport chains.

Preferably, a tray 11 comprises at least 5 and particularly advantageously 6, 7, 8, 9, 10 or more transport elements 13, arranged in rows relative to one another, which are aligned parallel or essentially parallel in relation to one another along their respective longitudinal extension.

Particularly advantageously, in this situation the multiplicity of trays 11 of a container transport device 1 are configured as identical to one another, and for this purpose comprise in particular the same number of transport elements 13 between one another.

In this situation provision can be made for the transport elements 13 to be configured along their longitudinal extension as slightly wider than the greatest width or greatest diameter of the containers 2 being conveyed by means of the transport elements 13. In particular, the transport elements 13 are configured as between 5 mm and 25 mm wider than the greatest width or the greatest diameter of the containers 2, particularly advantageously between 5 mm and 15 mm. This therefore ensures that the containers 2 of a row being conveyed standing upright on the transport elements 13 do not strike against the outer surface of the containers 2 of an adjacent row of the adjacent transport element 13.

Particularly advantageously, provision can also be made in this situation that the transport elements 13 are configured along their longitudinal extension as more than twice as wide as the respective greatest width or the greatest diameter of two containers 2 standing in contact with one another. In particular, the transport elements 13 are configured as between 5 mm and 25 mm wider than the respective greatest width or the greatest diameter of two containers 2 standing in contact with one another, particularly advantageously between 5 mm and 15 mm. Accordingly, two containers 2 can be introduced simultaneously onto one transport element 13 and unloaded from it, which leads to particularly rapid loading and unloading.

For loading an empty container transport device 1, this is moved and docked, preferably autonomously, by means of the docking unit 105, into the container handling machine provided with the reference number 101 in FIG. 1 and dispensing containers 2.

In this situation, the first tray 11 is moved with its transport surface TF to the relative height of the transport plane TE of the docking unit 105, such that a jerk-free transfer surface is provided between the transport surface TE of this first tray 11 and the transport plane TE of the corresponding docking unit 105.

For example, the loading of a tray 11 with containers 2 takes place per transport element 13 of this tray 11, i.e. in rows. By the specific actuation of a transport element 13, so many containers 2 are taken over from the dispensing container handling machine 101 until the corresponding transport element 13 is preferably filled completely with containers 2.

Following this, by means of the docking unit 105, by analogy, the connection is established to a further still empty transport element 13 of the same tray 11. By the specific actuation of the transport element 13 which is now connected, this transport element 13 is preferably also filled completely with containers 2. This process is repeated so often until all the transport elements 13 of a tray 11, i.e. until the entire tray 11 is filled with containers 2.

Following this, the tray 11, then loaded with containers 2, is moved into a parking position PP, and a further tray 11, still empty, is docked in the manner described by means of the docking unit 105. Next, all the transport elements 13 of this further tray 11 is filled with containers 2, before this next tray 11 is likewise moved into the parking position PP.

In this situation, the respective parking position of a corresponding tray 11 can be provided above and/or beneath the transport plane TE. When the corresponding trays 11 are parked in the respective parking position PP, they are raised and/or lowered above or below one another in such a way that the relative distance interval between two adjacent trays 11 amounts to the height of the containers 2 which are to be buffered, plus a small safety interval. The safety interval can in this case advantageously configured as between 5 mm and 15 mm. Accordingly, an optimum packing density can be achieved.

If the space above the transport plane TE alone is used as a parking position PP for full trays 11, then the still empty trays 11 are kept below the transport plane TE until they are filled. After being filled with containers 2, full trays 11 are moved above the transport plane TE.

If both the space above the transport plane TE as well as the space beneath it are used as parking positions PP for trays 11 filled with containers 2, then the still empty trays 11 are handled as stacks, and move at least partially in common and in synchrony. For example, first the topmost tray 11 is loaded and then moved upwards into a parking position PP, etc. Accordingly, in each case after the filling of a tray 11 with containers 2, one after another, the stack of trays 11 moves upwards into a parking position PP above the transport plane TE. The lowest tray 11 of the stack is meanwhile released from the stack and moved onto the transport plane TE, such that, following this, this lowermost tray 11 can then be loaded. Next, this tray 11 travels into the deepest possible parking position PP beneath the transport plane TE. This process is repeated until such time as all the trays 11 of a container handling device 1 are preferably filled with containers 2.

The unloading procedure of a container handling device 1 takes place in an analogous reverse sequence.

Provision can also be made for loaded trays 11, but also empty ones, to be located both on the dispensing container handling machines 101. 101' and also on the receiving machines.

Likewise, a container handling system 100 can comprise a multiplicity, for example 2, 3, 4, 5, 6, 7 or more container transport devices 1 configured in this manner. These container transport devices 1 can also be located in an intermediate position between the container outlet 102 of the first container handling machine 101 and the container inlet 102' of the second container handling machine 101', i.e. essentially "on the way". Likewise, a further container transport device 1 can be located in a waiting position between the container outlet 102 of the first container handling machine 101 and the container inlet 102' of the second container handling machine 101'.

The invention has been described heretofore on the basis of exemplary embodiments. It is understood that a large number of modifications and derivations are possible without thereby departing from the scope of protection of the invention defined by the claims.

In particular, provision is also made for the container transport device is arranged for the transporting of containers 2 in a container handling system, comprising a chassis 3 for supporting the container transport device 1 on a track FB, wherein a frame 10 is arranged at the chassis 3, provided on which is at least one tray 11 for transporting the containers 2 in a height adjustable manner, wherein the at least one tray 11 comprises a transport surface TF with several transport elements 13 arranged essentially parallel to one another for the intermediate storage and conveying of containers 2 in the form of rows, and wherein each of the transport elements 13 is configured so as to be driven in a controlled and/or regulated manner independently of the other transport elements 13, preferably in two different conveying directions.

Due to the fact that, in this embodiment, the transport elements 13 do not necessarily have to be driven in different conveying directions, simplifications are achieved in the structural design, the mechanical configuration, and also in the programming of the device according to the direction.

The contents of the claims are declared to be the object of the description.

REFERENCE NUMBER LIST

100 Container handling system
101, 101' Container handling machine
102 Container outlet
102' Container inlet
103, 103' Guide railings
104, 104' Guide channels
105, 105' Docking unit
106, 106' Buffer surface
108 Permanent magnets
1 Container transport device
2 Container
3 Chassis
4a, 4b, 4c, 4d Wheels
6 Control device
8 Magnetic sensor
9 Sensor
10 Frame
10.1 Holding means
11 Tray
12 Motor drive
13 Transport element
BE Floor plane
TF Transport surface
FB Track
PP Parking position

The invention claimed is:

1. A container transport device for transporting containers in a container handling system, the container transport device comprising:
a chassis for supporting the container transport device on a track;
a frame disposed on said chassis and a plurality of trays for transporting said containers height-adjustably supported on said frame;
said trays having a transport surface with a plurality of transport elements arranged substantially parallel to one another for intermediately storing the containers and conveying the containers in rows;
said trays being independently height-adjustable independently of one another; and
each of said transport elements being configured to be driven independently of other said transport elements.

2. The container transport device according to claim 1, wherein said transport elements are configured to be independently driven under open-loop or closed-loop drive control in at least two different conveying directions.

3. The container transport device according to claim 1, wherein said chassis comprises at least two motor-driven wheels for an autonomous movement of the container transport device along a predetermined movement path.

4. The container transport device according to claim 1, further comprising a navigation device for determining a position of the container transport device.

5. The container transport device according to claim 1, wherein said chassis comprises a sensor for protecting against collisions.

6. The container transport device according to claim 1, further comprising an input device configured for at least one of directly inputting or wirelessly receiving movement paths.

7. The container transport device according to claim 1, wherein a respective said tray is configured to be movable with the transport surface thereof to a relative height of a transport plane of the container handling machine.

8. The container transport device according to claim 7, wherein the respective said tray is steplessly movable relative to a level of the transport plane.

9. The container transport device according to claim 1, wherein each of said trays comprises an independent motor drive configured both for a height adjustment of the respective tray and for driving said transport elements of the respective said tray.

10. The container transport device according to claim 9, wherein the independent motor drive is a servomotor or a stepping motor.

11. The container transport device according to claim 1, wherein said plurality of transport elements of a respective said tray are configured to be driven under open-loop or closed-loop control at different conveying speeds.

12. The container transport device according to claim 1, wherein said trays are a plurality of identically configured trays.

13. The container transport device according to claim 1, wherein said transport elements are slightly wider along a longitudinal extension thereof than a greatest width or a greatest diameter of the containers to be conveyed by way of the transport elements.

14. The container transport device according to claim 1, wherein said transport elements are configured along a longitudinal extension thereof with a dimension that is more than twice a greatest width or a greatest diameter of two respective containers standing in contact with one another.

15. A container transport device for transporting containers in a container handling system, the container transport device comprising:
a chassis for supporting the container transport device on a track;
a frame disposed on said chassis and at least one tray for transporting said containers height-adjustably supported on said frame;
said at least one tray having a transport surface with a plurality of transport elements arranged substantially parallel to one another for intermediately storing the containers and conveying the containers in rows; and
each of said transport elements being configured to be driven independently of other said transport elements; and
a navigation device for determining a position of the container transport device, said navigation device including at least one magnetic sensor for determining a relative position of the container transport device in relation to magnets that are integrated in a floor plane of the track.

16. A container handling system, comprising:
at least one container transport device for transporting containers between a first container handling machine and a second container handling machine of the container handling system;
said at least one container transport device having at least one chassis for supporting the container transport device on a track and for movement between a container outlet of the first container handling machine and a container inlet of the second container handling machine;
a frame disposed on said chassis, and a plurality of trays height-adjustably supported on said frame and having a transport surface for transporting the containers, said trays being independently height-adjustable independently of one another; and
a plurality of transport elements arranged substantially parallel to one another for intermediately storing and conveying the containers in rows, with each of said transport elements being configured to be driven independently of other said transport elements.

17. The container handling system according to claim 16, wherein each of said transport elements is configured to be driven under open-loop or closed-loop drive control independently of the other said transport elements and to be driven in two different conveying directions.

18. The container handling system according to claim 16, wherein said container handling machines comprise at least one docking unit at said container inlet and/or at said container outlet for docking said container transport device.

19. The container handling system according to claim 16, wherein said container handling machines comprise a buffer surface for at least temporarily buffering the containers at the respective said container inlet and container outlet.

* * * * *